United States Patent [19]
Neti

[11] 3,870,468
[45] Mar. 11, 1975

[54] NITROGEN DIOXIDE ANALYSIS
[75] Inventor: Radhakrishna M. Neti, Brea, Calif.
[73] Assignee: Beckman Instruments, Inc., Fullerton, Calif.
[22] Filed: June 16, 1972
[21] Appl. No.: 263,543

[52] U.S. Cl. ........ 23/232 R, 23/230 PC, 23/253 PC, 219/301, 219/381, 219/553, 423/351, 423/405
[51] Int. Cl. ........................ G01n 31/12, H05b 3/10
[58] Field of Search ...... 23/232 R, 253 PC, 230 PC, 23/288 J; 219/374, 301, 381, 553; 423/351, 405, 445, 449

[56] References Cited
UNITED STATES PATENTS

| | | | |
|---|---|---|---|
| 1,400,959 | 12/1921 | Koetschet | 23/288 J X |
| 1,700,942 | 2/1929 | Lederer | 23/288 J |
| 2,333,845 | 11/1943 | Danforth | 423/400 X |
| 3,374,064 | 3/1968 | Kolsto | 23/253 PC |
| 3,497,674 | 2/1970 | Zirngibl et al. | 23/288 R X |
| 3,730,686 | 5/1973 | Breitenbach et al. | 23/232 R UX |

OTHER PUBLICATIONS
Beckwith Carbon Corporation, Bulletin on Vitreous Carbon.

Primary Examiner—Robert M. Reese
Attorney, Agent, or Firm—R. J. Steinmeyer; P. R. Harder

[57] ABSTRACT

A method and apparatus for converting nitrogen dioxide to nitric oxide for the ultimate reaction with ozone to cause a chemiluminescent reaction, the intensity of which is a function of the nitric oxide concentration. The method comprises passing the nitrogen dioxide through a small, confined volume and applying concentrated heat to the volume in the presence of suitable amounts of vitreous carbon. In one preferred embodiment the apparatus includes a quartz container and a filament constructed of vitreous carbon. In an alternative embodiment, loose vitreous carbon or a vitreous carbon rod is confined within the quartz container, and heat is applied by a heated stainless steel or nichrome filament surrounding the quartz container.

10 Claims, 3 Drawing Figures

PATENTED MAR 11 1975 3,870,468

NITROGEN DIOXIDE ANALYSIS

BACKGROUND OF THE INVENTION

The present invention relates to the thermal conversion of nitrogen dioxide to nitric oxide and, more particularly, to a method and apparatus for the measurement of the nitrogen dioxide concentration in a gas stream.

Nitric oxide and nitrogen dioxide are formed as by-products of the processes of combustion. Some of the sources of the combustion gases are power plants, automobiles, electric power generating stations, and home heating units. These sources, along with others, produce nitrogen oxides of varying concentrations. The nitrogen dioxide present in the atmosphere is a pollutant in that it not only presents a serious health hazard, but also reduces visibility.

It has become necessary to measure the level of nitrogen dioxide in the atmosphere in order to attempt to minimize the health hazards presented thereby. At the present time, several techniques are being practiced for the detection of nitrogen dioxide. Nitrogen dioxide is measured galvanically through its reaction with iodide in a suitable electrolyte, thereby liberating iodine. An alternative method involves collecting nitrogen dioxide in an aqueous solution and coupling it with an azo dye. The resulting color is used as a measure of the concentration. A third method is to measure the light absorption in the near ultra-violet to visible regions of the light spectrum. Unfortunately, all of these methods require very expensive apparatus which has prevented them from achieving any degree of widespread acceptance.

Nitrogen dioxide may also be measured after conversion to nitric oxide. Nitric oxide absorbs light either in the far ultra-violet or in the infra-red regions of the electromagnetic spectrum and spectrophotometers have been built to determine the nitric oxide levels. However, the usefulness of these devices decreases if the detection limits are a few parts per million, as they frequently are in polluted air.

Another method which is coming into use involves the study of some of the gas phase reactions of nitric oxide. One of these involves the reaction of nitric oxide with ozone creating a chemiluminescent reaction. The amount of light emitted as a by-product of the reaction can be used as a measure of the concentration of ozone or nitric oxide. A chemiluminescent device for the measurement of nitric oxide is disclosed in U.S. Pat. No. 3,528,779 to Fontijn, issued Sep. 15, 1970. Other apparatus for measuring the nitric oxide concentration in a gas stream is disclosed in Pat. No. 3,692,485 issued Sep. 19, 1972 on copending application Ser. No. 159,266, filed July 2, 1971, by Radhakrishna M. Neti and Colin C. Bing, for Nitric Oxide Detection and assigned to Beckman Instruments, Inc., the assignee of the present application.

In the apparatus of the type disclosed in the before-mentioned copending application, ozonized air or oxygen is mixed in a reaction chamber with nitric oxide. The emitted light from the homogeneous gas phase reaction is detected by a suitable photomultiplier and associated electronic circuitry. While this reaction is quite sensitive and has a wide dynamic range in regard to the concentration of nitric oxide analyzed, it lacks the sensitivity for analyzing nitrogen dioxide. It is, therefore, necessary to convert the nitrogen dioxide to nitric oxide before the reaction with ozone.

Nitrogen dioxide is known to decompose into nitric oxide either thermally, photochemically, or electrically. Generally, the sample is first passed directly into the reaction chamber and the intensity of the chemiluminescent reaction is measured. Since the gas sample will include both nitrogen dioxide and nitric oxide and since the reaction of the nitrogen dioxide is negligible compared to the reaction of the nitric oxide, the first intensity measurement is taken to be the result of the nitric oxide alone. The sample is then passed through stainless steel or other suitable containers which are heated by an external furnace. This causes thermal conversion of the nitrogen dioxide to nitric oxide and the sample is again reacted with ozone to derive a second intensity level. The difference between the two readings is then taken as a measure of the nitrogen dioxide content of the sample.

In order to achieve nearly complete conversion of the nitrogen dioxide to nitric oxide, it is necessary to operate the furnace at or above 800°C, depending upon the flow rate and the concentration of the sample. Furthermore, because of the long heat up and cool down time of the furnace, the furnace is usually operated continuously and it is necessary to alternately switch the sample through solenoid valves together with associated plumbing into and out of the furnace or directly into the reaction chamber. All of this requires an expensive installation, possible loss of the sample, and several minutes of analysis time.

Yet another method for achieving complete conversion of nitrogen dioxide to nitric oxide has been developed, utilizing a source of concentrated heat in a small confined volume. Since the heat can be rapidly applied and rapidly removed the sample can be passed through the confined volume and the reaction time is greatly reduced. The above-mentioned method is described in copending application, Ser. No. 248,871, filed May 1, 1972 by Radhakrishna M. Neti and T. Mark Bleak, assigned to the same assignee as the present application.

The last mentioned method has been found to be suitable for certain purposes. However the method involves relatively high temperature conversion, i.e., in the range of 800° to 1100°C. Furthermore the apparatus described in the above-mentioned application is difficult to fabricate and expensive to manufacture.

SUMMARY OF THE INVENTION

Accordingly it is an object of the invention to provide a method and apparatus for converting nitrogen dioxide to nitric oxide which overcomes the disadvantages mentioned above.

It is another object of the invention to provide a method and apparatus for converting nitrogen dioxide to nitric oxide at conversion temperatures lower than those utilized heretofore in the prior art.

It is a further object of the invention to provide a method and apparatus for converting nitrogen dioxide to nitric oxide by heating the sample gas within a small confined volume to a temperature in the range of 200° to 600°C. in the presence of suitable amounts of carbon or vitreous carbon which acts as a catalyzing agent.

It is yet another object of the invention to provide a method for converting nitrogen dioxide to nitric oxide which minimizes interference from ammonia and other sample gas components.

It is yet another object of the invention to provide a method and apparatus for converting nitrogen dioxide to nitric oxide where any interference from acetylene and other unsaturate organics is minimized.

The foregoing and other objects and advantages of the invention are obtained by a method which involves the conversion of nitrogen dioxide to nitric oxide within a small confined volume, by applying heat to the sample gas within the volume sufficient to raise the temperature of the gas to a range of 200° to 600°C. in the presence of suitable amounts of vitreous carbon which acts as a catalyzing agent in the reaction. Thus a combination of thermal and catalytic conversion of nitrogen dioxide to nitric oxide is attained. The apparatus, in one preferred embodiment of the invention, includes a quartz container having a vitreous carbon filament therein. In an alternative embodiment of the invention, a quartz tube is filled with particulate vitreous carbon and heat is applied to the tube by a nichrome or stainless steel filament surrounding the quartz tube.

DETAILED DESCRIPTION OF THE INVENTION

The present invention is designed for use in a system for the measurement of the quantity of nitrogen dioxide in a gas sample by the conversion of nitrogen dioxide to nitric oxide and the measurement of the chemiluminescent reaction between nitric oxide and ozone. According to the present invention, a sample containing nitric oxide, nitrogen dioxide, and other constituents is introduced into a reaction chamber with a measured amount of ozone. The intensity of the chemiluminescent reaction is measured to derive a first reading. The sample is then heated to convert the nitrogen dioxide to nitric oxide and the sample is again introduced into the reaction chamber with the ozone. The chemiluminescent reaction is again measured to derive a second reading. The difference between the first reading and the second reading results from the nitrogen dioxide which has been converted to nitric oxide so that the difference between the two readings is taken as a measurement of the nitrogen dioxide content of the sample.

Figure 1:
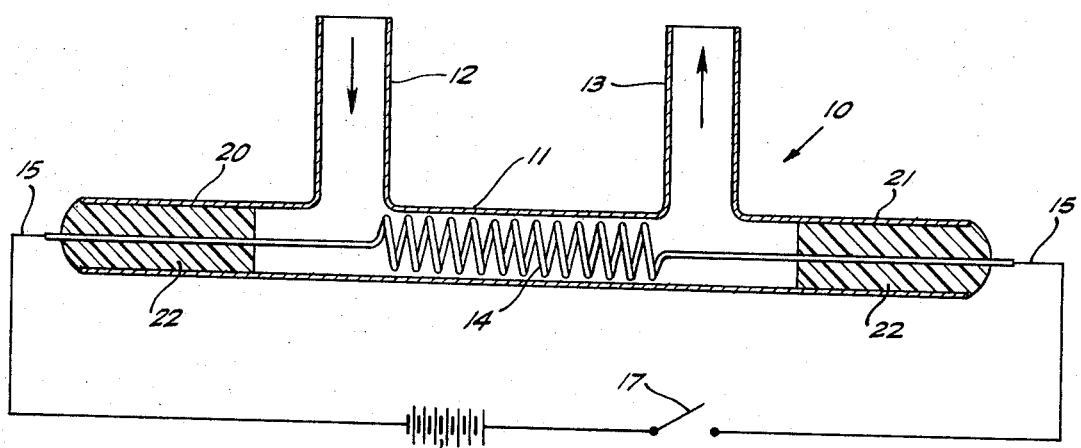
FIG. 1 is a sectional view of one preferred embodiment of the invention for the conversion of nitrogen dioxide to nitric oxide.

Referring now to FIG. 1, there is shown a first embodiment of conversion apparatus, generally designated 10, including an elongated container 11 having an inlet port 12 and an outlet port 13. Container 11 may be made from quartz, sapphire, pyrex glass, a ceramic material, or any other material capable of withstanding high temperatures. Positioned within container 11 is a filament 14 which may be made from vitreous carbon, or a mixture of carbon and ceramic material. Suitable vitreous carbon rods are available from Beckwith Carbon Corporation, designated as item number R-291.

Filament 14 extends through the length of chamber 11 and the opposite ends of filament 14 are connected to electrical leads 15 which are connected in series with a battery 16 and a switch 17. Accordingly, by closing switch 17, any desired voltage may be applied across filament 14 to heat filament 14 electrically. It is possible for filament 14 to heat to the temperatures necessary for the reaction, and to cool rapidly after the decomposition is accomplished. More specifically, the sample gas containing nitric oxide and nitrogen dioxide is continually passed from inlet port 12, through container 11, and out of outlet port 13 to the reaction chamber. With switch 17 open, no heat will be applied to the sample and the first chemiluminescent reaction may be measured. Thereafter, with the flow of sample through container 11 continuing uninterrupted, switch 17 may be closed and, within a matter of a second or two, filament 14 may be heated to temperatures in the order of 200° to 600°C. to decompose the nitrogen dioxide to nitric oxide. Accordingly, the second chemiluminescent reaction can be measured. When this is completed, switch 17 may be opened, whereby filament 14 will rapidly cool. During the decomposition step the vitreous carbon filament acts as a catalyst in the decomposition reaction. Furthermore, because of the localized heat, the decomposition of nitrogen dioxide to nitric oxide is accomplished in a relatively small volume element up to 10,000 ppm of nitrogen dioxide, either in nitrogen or in air samples. The ability to generate localized temperatures and the use of a vitreous carbon catalyst minimizes the interference that might otherwise be encountered in the thermal decomposition technique. In addition, high flow rates are obtainable.

Still referring to FIG. 1, the opposite ends 20, 21 of container 11 are sealed by plugs 22 formed of ceramic sealing compound or high temperature epoxy. Plugs 22 form a gas tight seal at the ends of the container and surround the opposite ends of filament 14, thereby retaining the filament in the chamber.

In the embodiment of FIG. 1, filament 14 comes in direct contact with the sample gas passing through container 11. Accordingly, with time, filament 14 if composed of ordinary carbon may evaporate. Therefore another embodiment of the invention has been designed wherein the sample gas does not contact the filament.

Figure 2:
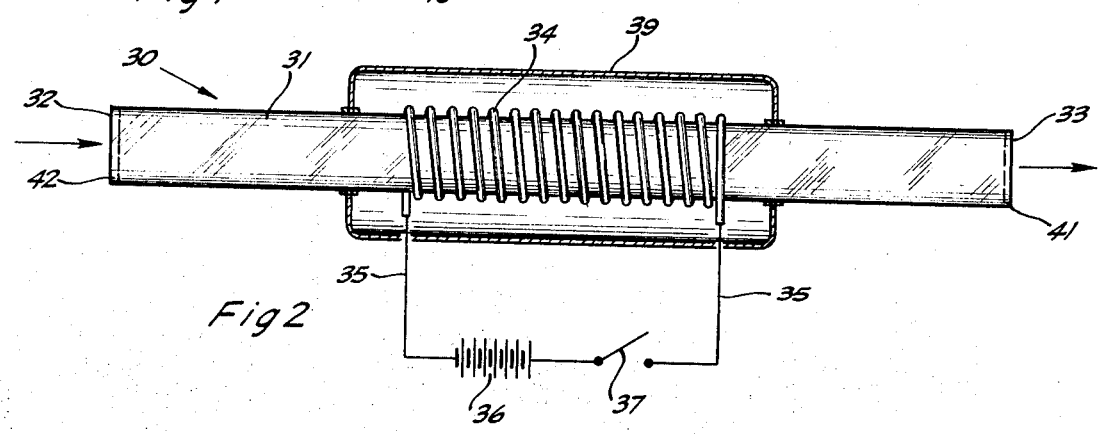
FIG. 2 is a sectional view of another embodiment of the invention.

More specifically, and with reference now to FIG. 2, there is shown a second embodiment of conversion apparatus, generally designated 30, including an elongated quartz tube 31 having an inlet 32 and an outlet 33. Apparatus 30 also includes a filament 34 which is wound around the outside of tube 31. The opposite ends of filament 34 are connected to leads 35 which form a series electrical circuit with a battery 36 and a switch 37. Since filament 34 is now wound around the outside of tube 31, the heat is contained by positioning tube 31 and filament 34 within an outer container 39 which may also be made of quartz. Quartz tube 31 is filled with particulate carbon, confined between the ends of the tube by screens 41, 42. If desired a rod of vitreous carbon could be confined within the quartz tube, exposed to the sample gas.

Operation of the embodiment of FIG. 2 is similar to that of FIG. 1. The sample is passed through tube 31 with switch 37 open and the chemiluminescent reaction with ozone is measured. This gives a response to nitric oxide only. Then, switch 37 is closed and filament 34 heated electrically. This gives the analysis of the nitric oxide and the nitrogen dioxide. All this can be done either manually or automatically in a matter of a few seconds, giving a very rapid and very reliable analysis of the oxides of nitrogen.

In the embodiment of FIG. 2, since the sample does not come in contact with filament 34, filament 34 need not be made from a material which will not chemically react with nitrogen dioxide or nitric oxide. Accordingly, a filament of stainless steel or nichrome may be advantageously used. On the other hand, the response time of apparatus 30 is slower than that of apparatus 10 since quartz is an insulator and there is not a high degree of heat transfer through tube 31. In order to increase the heat transfer, it is possible to coat the inner surface of container 31 with a thin film of a good conductor such as gold or platinum. This increases the heat transfer from the walls of container 31 to the sample therein.

Figure 3:
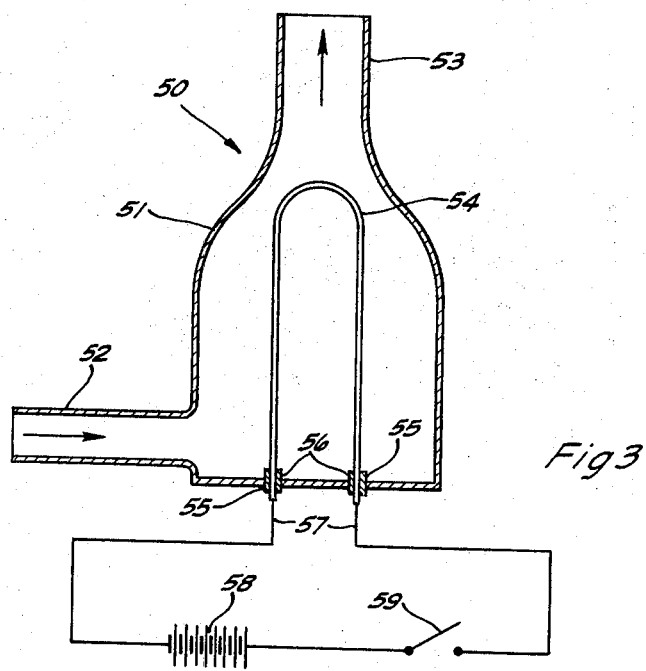
FIG. 3 is a sectional view of yet a third embodiment of the invention.

Referring now to FIG. 3, there is shown a third embodiment of a conversion apparatus, generally designated 50, including a container 51, somewhat in the shape of a stovepipe, having an inlet 52 at the bottom thereof and an outlet 53 at the top thereof. Container 51 may be made of quartz or any of the other materials discussed previously. Positioned within container 51 is a U-shaped filament 54 made of vitreous carbon. The opposite ends of filament 54 may be bonded within glass sleeves 55 which extend through openings in the bottom of container 51. The openings may be sealed with a suitable ceramic sealing compound or a high temperature epoxy 56. The ends of filament 54 external to container 51 may then be connected to electrical leads 57 for connection to a battery 58 and a switch 59, as discussed previously.

With respect to each of the embodiments described hereinbefore, it should be recognized that the nitrogen dioxide is converted to nitric oxide by a thermal process which occurs at the relatively low temperature range of 200° to 600°C. due to the presence of the vitreous carbon as a catalytic agent. In the case of thermal conversion at such low temperatures, in the absence of carbon, a gas mixture of $NO_2$ and $NO$ together with other constituents, such as $CO_2$, $H_2O$, $NH_3$, and the like, could result in intermediate products other than NO in the final product, especially at sufficiently rapid flow rates. However, if the described temperatures are utilized in conjunction with vitreous carbon, these intermediate products will be completely converted into nitric oxide. It has been found that amounts of vitreous carbon ranging from 0.5 to 0.8 grams are suitable for use in a small chamber with flow rates up to 150 cc/minute. Still higher flow rates are attainable by suitably increasing the length of the reaction chamber.

The vitreous carbon is particularly advantageous since it acts, in the presence of the temperatures utilized, as a reductant and does not produce oxidation products that interfere with the continued $NO_2$ conversion. This is important in minimizing interference in the reaction from ammonia and other components, as well as interference from acetylene and other unsaturate organics. The results attained with vitreous carbon as a catalytic agent would, therefore, not be attainable with other non-reducing catalytic agents.

While the invention has been described with respect to the preferred physical embodiments constructed in accordance therewith, it will be apparent to those skilled in the art that various modifications and improvements may be made without departing from the scope and the spirit of the invention. Accordingly, it is to be understood that the invention is not to be limited by the specific illustrative embodiments, but only by the scope of the appended claims.

What is claimed is:

1. A method of treating nitrogen dioxide comprising:
   passing said nitrogen dioxide through a small, confined volume containing a catalytic agent selected from the group of vitreous carbon, and a carbon and ceramic mixture, and
   applying heat to said confined volume to heat said nitrogen dioxide to a temperature in the range of from 200°–600°C. whereby the nitrogen dioxide is substantially fully converted to nitric oxide during application of said heat.

2. A method according to claim 1 wherein said nitrogen dioxide is passed continuously through said volume and wherein said heat is alternately applied and removed.

3. Apparatus for converting nitrogen dioxide to nitric oxide comprising:
   means defining a small, confined volume containing vitreous carbon, said means having an inlet and an outlet for the conduction of said nitrogen dioxide therethrough; and
   means for generating and applying to said confined volume concentrated heat.

4. Apparatus according to claim 3 wherein said means defining a small, confined volume comprises an elongated container having an inlet at one end thereof and an outlet at the other end thereof.

5. Apparatus for converting nitrogen dioxide to nitric oxide comprising:
   a container having an inlet and an outlet for the conduction of nitrogen dioxide therethrough,
   a vitreous carbon filament within said container, and
   means for energizing said filament to apply heat to said container.

6. The apparatus of claim 5 including means for heating the contents of the container to a temperature of 200° to 600°C.

7. The apparatus of claim 6 wherein the container is elongate in form and is also packed with vitreous carbon particles.

8. The apparatus of claim 7 wherein the container is fabricated of quartz.

9. Apparatus for converting nitrogen dioxide to nitric oxide comprising:
   an elongate tube having an inlet at one end thereof and an outlet at the other end thereof, porous screens closing the ends of said tube, and said tube being at least partially filled with vitreous carbon;
   a filament in heat transmitting relation to said tube; and
   means for energizing said filament to apply heat to said tube.

10. The apparatus of claim 9 wherein the vitreous carbon is in particulate form.

* * * * *